United States Patent [19]

Hwang

[11] Patent Number: 4,786,444

[45] Date of Patent: Nov. 22, 1988

[54] METHOD AND APPARATUS FOR MAKING OPTICAL DEVICES

[75] Inventor: Kirk K. S. Hwang, Woodbury, Minn.

[73] Assignee: Minnesota Mining and Manufacturing Company, St. Paul, Minn.

[21] Appl. No.: 57,015

[22] Filed: Jun. 1, 1987

Related U.S. Application Data

[63] Continuation of Ser. No. 811,158, Dec. 19, 1985, abandoned.

[51] Int. Cl.$^4$ ............................................. B29D 11/00
[52] U.S. Cl. .................................... 264/1.4; 249/102; 249/120; 249/139; 264/2.2; 264/85; 425/192 R; 425/454; 425/472; 425/808
[58] Field of Search .................. 264/1.1, 1.4, 2.2, 2.5, 264/85; 425/808, 192 R, 454, 472; 249/102, 120, 139

[56] References Cited

U.S. PATENT DOCUMENTS

| | | |
|---|---|---|
| 2,373,201 | 4/1945 | Smith . |
| 2,424,235 | 7/1947 | Hoffer ................................ 425/808 |
| 3,422,168 | 1/1969 | Bowser . |
| 4,121,896 | 10/1978 | Shepherd ........................... 425/412 |
| 4,132,518 | 1/1979 | Rips .................................... 425/143 |
| 4,208,364 | 6/1980 | Shepherd ........................... 264/313 |
| 4,383,672 | 5/1983 | Kreuttner .......................... 425/808 |
| 4,469,646 | 9/1984 | Rawlings ........................... 264/2.2 |

FOREIGN PATENT DOCUMENTS 135030 10/1981 Japan .................................... 264/2.2

Primary Examiner—James Lowe
Attorney, Agent, or Firm—Donald M. Sell; James V. Lilly

[57] ABSTRACT

An apparatus and method is described which is useful in manufacturing molded optical devices. The apparatus and method provide automatic alignment of the mold elements so that cylinder and prism free lenses are provided.

19 Claims, 2 Drawing Sheets

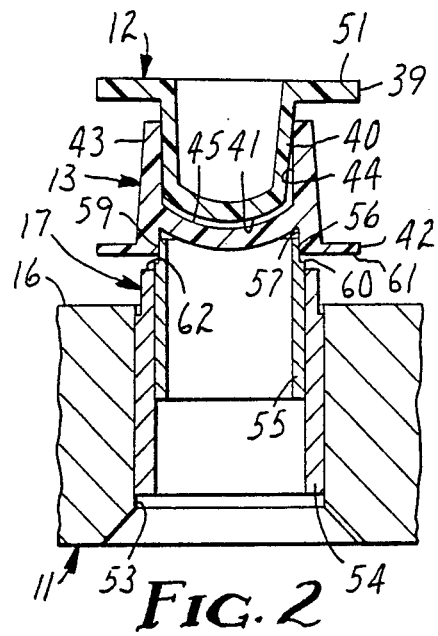
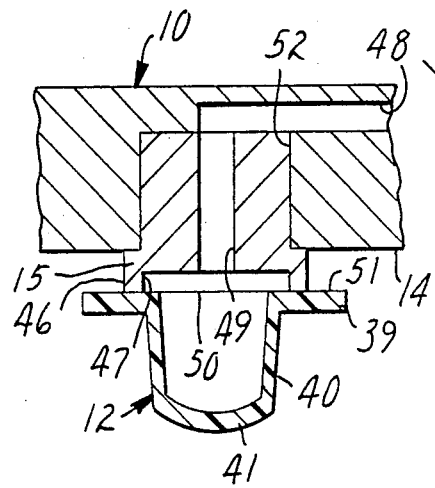
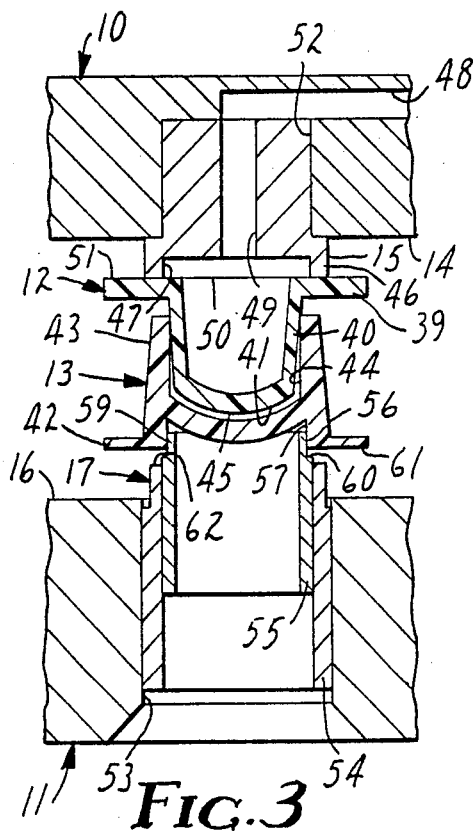
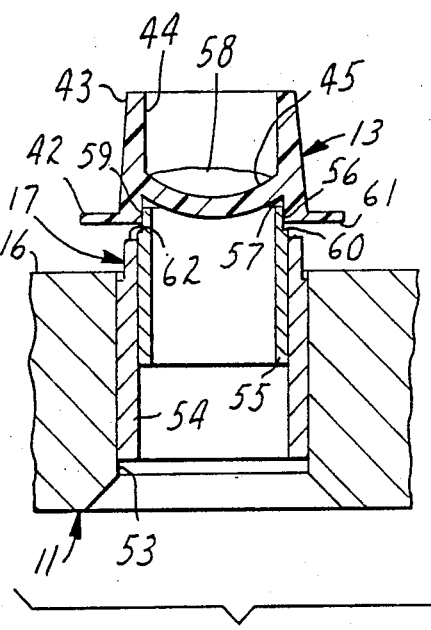
FIG. 2
FIG. 3
FIG. 4

METHOD AND APPARATUS FOR MAKING OPTICAL DEVICES

This is a continuation of application Ser. No. 811,158 filed Dec. 19, 1985, now abandoned.

TECHNICAL FIELD

This invention relates to an apparatus and a method for the manufacture of optical articles. More particularly it relates to an apparatus and method for the manufacture of optical articles from reactive components.

BACKGROUND ART

Optical articles, that is devices for aiding vision, whether through image magnification, image intensification, or vision correction, are well known. Examples of such articles include camera lenses, binocular and telescope lenses, spectacle lenses, intraocular lenses, contact lenses, and lenses used in corneal transplants and implants.

Glass was the earliest material used to make such devices. However, glass has been replaced by polymeric materials as the material of choice in many such devices.

Often polymeric optical devices are made from reactive organic precursors by reacting (e.g., polymerizing, vulcanizing, etc.) one or more components in a mold. Examples of such processes are disclosed in U.S. Pat. Nos. 4,121,896 and 4,208,364 which are directed to a mold device and a method of using that device, and in U.S. Pat. No. 4,469,646 which is directed to another molding method. These processes are illustrative of the techniques employed to manufacture vision correcting lenses such as contact lenses by molding techniques.

These molding processes suffer from the disadvantage that the mold halves employed are often not properly aligned with one another (i.e., their principal longitudinal axes are not in coincident alignment) so that the resultant lenses are toric, i.e., they contain cylinder and prism defects. This occurs because the mold members are generally placed together by hand and then, optionally, pressed together. However, pressing the mold halves together in this fashion often fails to properly align the mold halves. Accordingly, great care must be taken when placing the mold halves together.

DISCLOSURE OF THE INVENTION

The present invention overcomes these disadvantages. It provides a method in which the mold halves are automatically (or self) aligned and an apparatus which accomplishes this self-alignment. As a result, optical articles are made which are free from toricity, cylinder and prism defects caused by misalignment.

The apparatus comprises top and bottom mold supports which are movable with respect to one another. Each support has a planar surface which is in confronting parallel relationship to the planar surface of the other support. The planar surfaces preferably have means for holding one half of a mold on one of the surfaces in coincident alignment with the mating half of the mold held on the other of the surfaces.

The method comprises the steps of
placing the mold halves together and supporting one of the mold halves on one of the mold supports to coincidentally align the principal longitudinal axes of the mold halves;
securing the mold halves to the planar surfaces of the mold supports;
opening the mold by moving the mold supports linearly away from one another while keeping the mold halves in coincident alignment;
injecting reactive material into one of the mold halves;
closing the mold by moving the mold supports linearly toward one another while maintaining the mold halves in coincident alignment;
reacting the reactive material; and
recovering the optical article.

BRIEF DESCRIPTION OF THE DRAWINGS

The present invention will be described with reference to the accompanying illustrative drawings wherein like reference characters refer to the same elements throughout and wherein

FIG. 2 is an enlarged cross sectional view of a bottom mold support with a mold supported thereon;

FIG. 3 is an enlarged cross sectional view of the top and bottom mold supports in the closed position so as to align the mold; and FIG. 4 is an enlarged cross sectional view of the top and bottom mold supports in the open position with reactive material introduced into the lower or female mold half.

DETAILED DESCRIPTION

Figure 1:
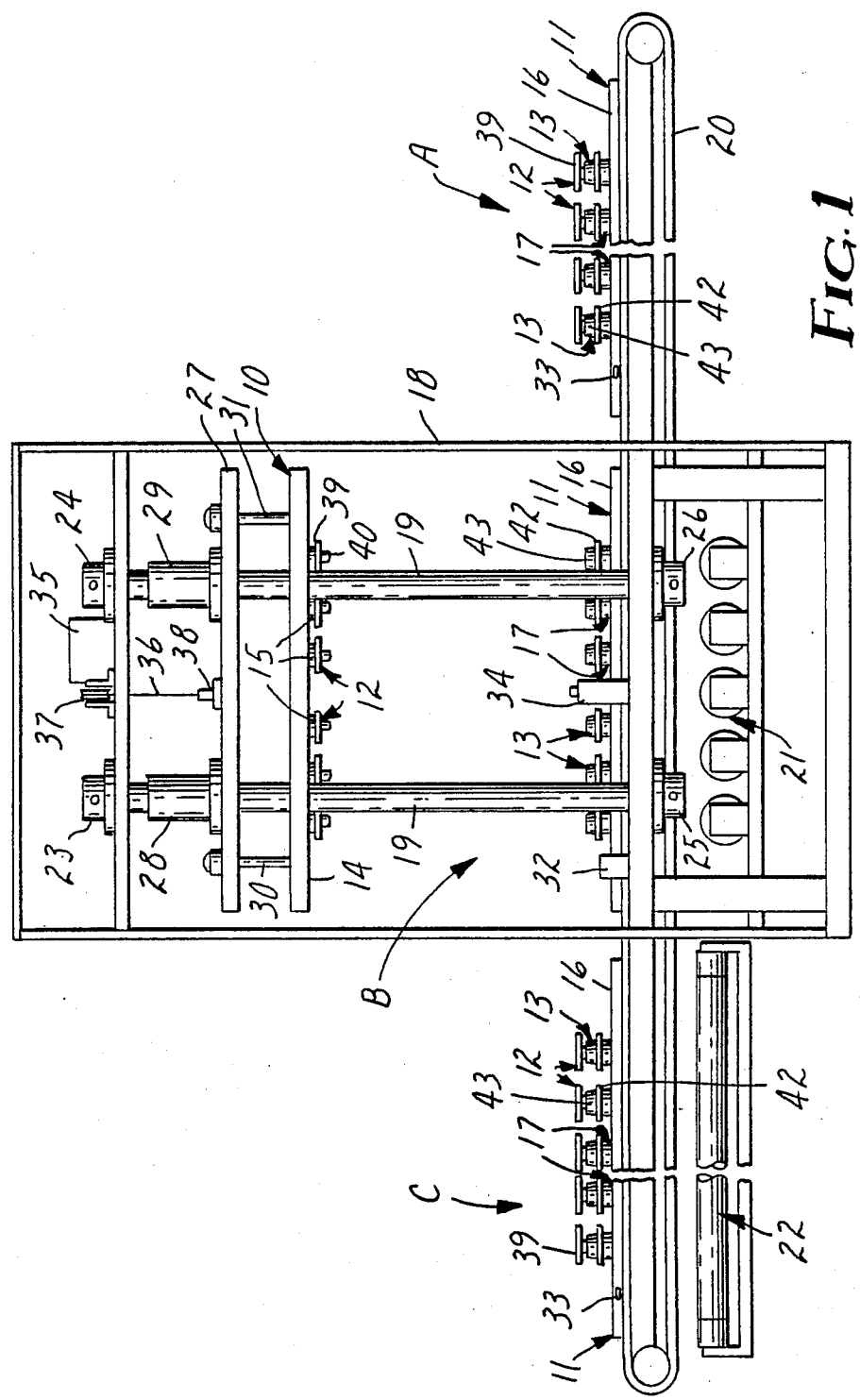
FIG. 1 is a side view of an apparatus according to the invention.

Referring first to FIG. 1, the apparatus of the invention comprises top support 10 and bottom support 11. Each is linearly moveable with respect to the other so as to open and close first mold portion 12 (here shown as a male mold half) and second mold portion 13 (here shown as a female mold half). Support 10 comprises a first planar surface 14 and positioning means 15 for holding first mold portion 12. Support 11 comprises a second planar surface 16 which is in confronting, parallel relationship to planar surface 14. Planar surface 16 has locating means 17 for holding second mold portion 13 in constant position throughout the operation of the apparatus.

The apparatus of the invention preferably comprises several additional features which include, by way of example, a frame 18 which supports guiding means 19 (here illustrated as four columns—two behind the two shown); conveying means 20 (here illustrated as a continuous motor driven conveyor belt—motor not shown); and radiation means 21 and 22 (here shown as banks of ultraviolet lights).

Guiding means 19 are fixed to frame 18 at 23, 24, 25 and 26. The columns pass through top support 10 such that the top support may move freely up and down them. A backing plate 27 is located above, and substantially parallel to, top support 10. Backing plate 27 is moveable on the columns. Bushings 28 and 29 are provided on backing plate 27 to aid in guiding the columns.

Top support 10 is attached to backing plate 27 by rods 30 and 31. These rods are permanently secured to the top support 10 but permit backing plate 27 to slide thereon.

The apparatus further preferably comprises a switching means 32 which cooperates with a tab 33 on bottom support 11 to stop the horizontal travel of the bottom support through the apparatus. A height adjustment means 34 is also preferably provided. As shown here, it is attached to the lower portion of frame 18. It controls the downward movement of top support 10 thereby controlling the thickness of whatever optical article is to be made.

Top support 10 is moved vertically by means of a motor 35. Motor 35 is attached to backing plate 27 by a cable 36 which passes around a pulley 37 and connects to the backing plate 27 at 38.

Referring now to FIGS. 2–4, details of one embodiment of the top and bottom supports 10 and 11 and the first and second mold portions 12 and 13 will be discussed.

The first and second mold portions 12 and 13 are preferably held in a desired position on the planar surfaces 14 and 16 of supports 10 and 11 by positioning means 15 and locating means 17. The positioning means 15 is seen most clearly in FIG. 3 and the bottom half of FIG. 4. The locating means 17 is seen most clearly in FIGS. 2–4.

Positioning means 15 may be of any desired shape. It is shown here as being generally cylindrical and is held in cavity 52 in top support 10. It has a flange portion 46 which contains a recess 47. Recess 47 is connected to channel 48 in the top support 10 by passage 49. The recess 47, channel 48 and passage 49 combine to provide a pathway through the positioning means 15 for attachment to a vacuum pump (not shown). Surface 50 on positioning means 15 is preferably a precision flat surface which is preferably maintained in a parallel relationship to surface 14 and which contacts equally precise flat surface 51 on the first mold half. This permits accurate placement of first mold portion 12 on positioning means 15. The first mold portion can then be accurately secured to the positioning means by merely turning on the vacuum pump.

Other techniques can, of course, be utilized to secure the first mold portion to the top mold support. For example, a thin layer of magnetic material could be applied around surface 51 so that a metal positioning means would attach thereto. Alternatively, a layer of a pressure sensitive adhesive could be attached to either surface 50 or surface 51 to secure the first mold portion to the positioning means. Yet other securing techniques are possible as will be understood by those skilled in the art and are intended to be included within the scope of this invention.

Locating means 17 may be of any desired shape. It is shown as being generally cylindrical and is held in chamber 53 in bottom support 11. It comprises an outer sleeve 54 and an inner sleeve 55. Outer sleeve 54 has a top horizontal surface 62. Inner sleeve 55 extends above outer sleeve 54 and has a shoulder portion 56 having vertical surface 59 and horizontal surface 60 around its upper end to receive second mold portion 13. Preferably inner sleeve 55 is slidable in outer sleeve 54.

The positioning means 15 and the locating means 17 may, of course, have a variety of other configurations. Those illustrated in the drawings are merely representative. Furthermore, a plurality of positioning and locating means may be employed on each of the top and bottom supports. The array of positioning and locating means must be identical for a given set of top and bottom supports so as to permit coincident alignment of the mold halves on the two supports.

The mold portions employed in the present invention may also be selected from a variety of configurations. For purposes of illustration, a mold comprising a simple male mold half and a simple female mold half are shown. The male mold half 12 comprises a base 39, a cylindrical body 40 which extends upward from base 39, and a first or exterior molding surface 41 which closes the top of body 40. The male mold half shown is hollow. However, this is done solely for convenience and to lessen the amount of material used to make the mold.

The female mold half 13 comprises a base 42, a cylindrical body 43 which extends upward from base 42, and an interior molding surface 45 which closes the bottom of body 43. Base 42 has bottom flat surface 61. Cylindrical body 43 and interior molding surface 45 define a cavity 44 whih is adapted to receive the male mold half 12. The first and second mold portions each have a principal longitudinal axis which, most preferably, is coincident with the principal longitudinal axes of the two molding surfaces.

Female mold half 13 further comprises an annular recess 57 which is adapted to be received on shoulder portion 56 of the locating means 17. The relative diameters of recess 57 and shoulder portion 56 are preferably such that second mold half 13 is held on the shoulder portion by means of friction. In this case it is highly desirable that the contacting surfaces of recess 57 and shoulder portion 56 are precision made and are complimentary to one another to insure that the second mold half will be held in proper alignment during the lens manufacturing process. The force holding the second mold half on the locating means should be sufficient to maintain the second mold half in proper alignment during lens manufacture, but not be so great as to prevent the second mold half from being properly aligned during the alignment step of the lens manufacturing procedure.

If the diameter of recess 57 is too large to permit the second mold half to be held on surface 59 of shoulder portion 56, then the second mold half will contact and be supported by horizontal surface 60 of the shoulder portion. In this instance surface 60 and surface 61 will contact. Alternatively, horizontal surface 60 could contact horizontal top surface 62 of the outer sleeve. In either case, in order to insure that the bottom mold half is properly aligned, these surfaces must be precision or flat surfaces which permit the longitudinal axis of the bottom mold half to be maintained at 90° to surface 16.

The operation of the lens manufacturing process will be discussed primarily with reference to FIG. 1. During the process the male mold half 12 is placed in the female mold half 13 and this assembly is then placed on the locating means 17 of the bottom support 11. This assembly is shown in detail in FIG. 2. As can be seen, the male mold half 12 is generally slightly askew so that the principal longitudinal axes of the two mold halves are not in coincident alignment.

Preferably the mold halves have been previously ultrasonically cleaned in a bath containing distilled water and a surfactant for at least one hour, rinsed in cold tap water, then with distilled water, and then blown dry with nitrogen. It is also preferred that certain types of the first and second mold elements (e.g., those made from polypropylene) have been plasma treated with, for example, an oxygen plasma at a plasma pressure of 0.25 mm of Hg and 50 watts of power for 10 seconds.

Referring again to FIG. 1, the assembled molds and bottom support 11 are then transported from position A (the assembly station) to position B (the alignment station) by the conveying means 20. The travel of the conveying means 20 is stopped when switch 32 is contacted by tab 33. The switch and the tab are located so as to insure that the support means 11 stops at the same location relative to top support 10 every time. This location is selected to insure that the positioning means 15 on top support 10 are aligned with the locating means 17 on bottom support 11.

Once bottom support 11 has been properly positioned at the alignment station, the top support 10 is placed in contact with and pressed against the male mold half 12 as is shown in FIG. 3. This step corrects any deviations in alignment which may be present and puts the principal longitudinal axes of the first and second mold halves and that of the locating means into coincident alignment. For example, if male mold half 12 is not properly aligned, the mating contact between surface 50 on positioning means 15 and surface 51 on male mold half 12 will correct the misalignment. Moreover, if female mold half is not resting on surface 60 of locating means 17 (and is therefore not properly aligned), the pressure applied to the female mold half 13 through the male mold half 12 will force the female mold half to right itself on locating means 17 and go into proper alignment.

When the male mold half is placed in the cavity 44 of the female mold half, and the two mold halves aligned with respect to one another, the exterior and interior molding surfaces 41 and 45 are in opposed, confronting relationship. The space between these surfaces defines the shape and thickness of the optical article to be made. The curvature of the two molding surfces can be varied so as to achieve the desired optical surfaces on the finished optical article.

After coincident alignment is achieved, male mold half 12 is secured to the positioning means 15, in this case, by vacuum. Male mold half 12 is then withdrawn from female mold half 13 by raising the top support 10. See FIGS. 1 and 4. Male mold half 12 remains attached to top support 10 and accordingly remains in coincident alignment.

With the two mold halves apart, a predetermined quantity of reactive material 58 is charged to female mold half 13. See FIG. 4. The mold is then closed by lowering top support 10 and inserting male mold half 12 into cavity 44 of female mold half 13. During this operation the mold halves remain in coincident alignment.

The downward travel of top support 10 and the male mold half is stopped by both the presence of reactive material 58 and the presence of height adjustment means 34. Height adjustment 34 is preferably provided to determine when the mold has been closed to a desired point and stop downward travel of top plate 10. While FIG. 1 shows a single height adjustment means, it is understood that more than one may be employed if desired.

In a preferred embodiment of the invention, the top support 10 is provided with backing plate 27. In the event that height control switch 34 fails to stop motor 24, top support 10 will be stopped when it comes to rest on height control switch 34. Because of the interaction between top support 10 and backing plate 27, continued operation of the motor 35 will not cause serious damage to the apparatus and will enable the operator to shut it off.

The reactive material in the mold is then reacted. The conditions, e.g., time, temperature, etc., employed are determined by the nature of the reactive material used. Once the reaction is completed, the molds are opened and the optical articles are recovered. Reaction may be carried out in one or more steps. If multiple steps are utilized, it has been found useful to react the reactive materials to just short of their gel point and then release one or both of the mold halves from the positioning and/or locating means to allow the mold half or halves to follow the reactive material if it shrinks during the remainder of the reaction. This prevents the formation of surface voids caused by the reactive materials pulling away from the molding surfaces of the mold.

Typically, male mold half 12 will be released from the positioning means 15 in this process. Top support 10 may then be raised and the molds with partially cured optical lenses transported to position C (the final curing station) where the reaction of the reactive material may be completed. Once reaction is complete, the molds are opened and the optical articles recovered.

A variety of techniques may be used to react the reactive precursors including thermal radiation, infrared radiation, electron beam radiation, gamma radiation, ultraviolet radiation or the like. Moreover, combinations of such techniques may be used. The molds employed must permit the passage of activating radiation so as to permit the reaction to proceed. Additionally they must be capable of withstanding the operating conditions encountered during manufacture of the optical devices. A number of mold materials are useful, including glass, quartz and polymeric materials. Examples of useful polymeric materials are described in U.S. Pat. No. 4,208,364. Polypropylene and poly(ethylene terephthalate) are particularly useful mold materials.

While the process and apparatus of the invention may be employed to make any optical device, it is particularly useful in the manufacture of ophthalmic devices which go on or into the eye. These devices, which include intraocular lenses, contact lenses, corneal transplant lenses and corneal implant lenses must be very accurate in the location of the longitudinal axes of each surface.

The reactive material utilized in the process of the invention may be any composition which undergoes a chemical change, such as by polymerization, vulcanization, etc., to form a different material. A wide variety of such materials are known. They include the methyl methacrylate, xerogel materials which can be hydrated to form the so-called hydrogel contact lenses (e.g., poly(2-hydroxyethylmethacrylate) or poly(N-vinylpyrrolidone)), silicone/acrylate materials, and telechelic perfluoropolyethers such as are disclosed in U.S. Pat. No. 4,440,918.

The following examples further illustrate the present invention.

EXAMPLE 1

Ten mold assemblies adapted to produce contact lenses were placed on the locating means shown in FIG. 2. The top support was lowered to contact the male mold halves of the assembly and to align the mold halves so that the principal longitudinal axes of the assemblies were coincident with each other and with that of the locating means. Vacuum was applied to the top support and the top support with the male mold halves attached thereto were removed from the female mold halves. A nitrogen atmosphere was then started and maintained throughout the remainder of the process.

A small quantity (100 $\mu$l) of a mixture of 70 weight percent of the telechelic perfluoropolyether of Example 1 of U.S. Pat. No. 4,440,918, 20 weight percent of N-vinylpyrrolidone, and 10 weight percent of methyl methacrylate and 0.05 parts by weight of 2,2-diethoxyacetophenone was charged to each of the female mold halves. The top support was lowered so that the male mold halves were inserted into the female mold halves. The mixture was exposed to ultraviolet radiation through the molds for 10 seconds using a light intensity of $1 \times 10^{-3}$ watt from a GTE Sylvania 350 ultraviolet lamp. The vacuum was released from the male mold half and exposure of the reaction mixture to ultraviolet light was continued for an additional hour. The mixture was then annealed in the mold by heating at 80° C. for an additional 0.5 hour without ultraviolet light. The lenses were separated from the molds and were found to have sharp optical acuity as measured by a Radiuscope (American Optical, Buffalo, N.Y.) and to be nontoric.

EXAMPLE 2

The apparatus and procedures employed in Example 1 were repeated with the following changes:
(a) The reactive material comprised 2-hydroxyethyl methacrylate (HEMA).
(b) The reacted lenses were annealed for one hour.
The resulting contact lenses were found to have sharp optical acuity as measured by a Radiuscope (American Optical, Buffalo, N.Y.) and to be nontoric.

EXAMPLE 3

Example 1 was repeated with the following changes:
(a) The reactive material comprised methyl methacrylate syrup and 0.25 weight percent Darocur ® 1173.
(b) The reacted lenses were annealed for one hour.
The lenses were found to have good optical acuity and to be nontoric.

I claim:
1. A method for the manufacture of optical devices from reactive precursors comprising the steps of:
   I. providing
      A. a mold which has
         (a) a first mold portion which has a first molding surface with a first principal longitudinal axis;
         (b) a second mold portion which has a second molding surface with a second principal longitudinal axis and which is adapted to cooperate with said first mold portion to form a cavity to receive said reactive precursors;
      B. a molding device which has separate top and bottom mold supports, said mold supports being oriented vertically with respect to one another, and being movable vertically with respect to one another, wherein
         (a) said top mold support has a first planar surface for contacting said first mold portion and vacuum means for positioning said first mold portion on said first planar surface so that said first principal longitudinal axis is maintained perpendicular to said first planar surface;
         (b) said bottom mold support has a second planar surface for contacting said second mold portion and locating means for positioning said second mold portion on said second planar surface, said second planar surface being maintained in opposed, parallel relationship to said first planar surface;
   II. placing said first and second mold portions together to form said cavity and supporting said second mold portion on said locating means of said second planar surface;
   III. moving said first planar surface into contact with said first mold portion so as to position the first and second principal longitudinal axes perpendicular to said first and second planar surfaces respectively and place said axes in coincident alignment with each other;
   IV. securing said first mold portion to said first planar surface by means of said vacuum means and removing said first mold portion from said second mold portion by moving the mold supports vertically away from one another while maintaining the coincident alignment;
   V. injecting reactive material into said second mold portion;
   VI. closing said mold by vertically moving said first mold portion into said second mold portion while said first mold portion remains attached to said first planar surface in said coincident alignment thereby causing said reactive material to assume the shape of said cavity;
   VII. at least partially reacting said reactive material while said first and second planar surfaces contact said first and second mold portions; and
   VIII. recovering said optical device from said mold.

2. A method according to claim 1 further comprising a predetermined array of vacuum means on said first planar surface.

3. A method according to claim 2 wherein said vacuum means each comprise a cylindrical body set in a cavity in said first planar surface, each body having a flange at one end thereof with a face parallel to said first planar surface for receiving said first mold portion, and a passageway therethrough for connection to a vacuum pump.

4. A method according to claim 3 wherein said locating means comprise a cavity in said second planar surface, an outer sleeve in said cavity, and an inner sleeve in said outer sleeve, wherein said inner sleeve has a shoulder portion for receiving said second mold portion.

5. A method according to claim 1 wherein said first and second mold portions are plasma treated prior to injection of said reactive material.

6. A method according to claim 1 wherein said method is carried out in an inert atmosphere.

7. A method according to claim 1 wherein reaction is carried out by exposure to activating radiation selected from thermal radiation, infrared radiation, electron beam radiation, gamma radiation and ultraviolet radiation.

8. A method according to claim 1 wherein reaction of said reactive materials is completed by exposure to ultraviolet light.

9. A method according to claim 1 wherein reaction is carried out by partially reacting said reactive precursors followed by releasing said first mold portion from said top mold support and completing said reaction.

10. A method according to claim 1 wherein reaction is carried out by partially reacting said reactive precursors followed by releasing said second mold portion from said bottom mold support and completing said reaction.

11. A method for the manufacture of a vision correcting optical device comprising the steps of:
   A. providing a mold which is comprised of (a) a cylindrical male mold portion having a base around a first end thereof, an exterior molding surface capable of forming a first optical surface on a second end thereof and a first principal longitudinal axis;

(b) a female mold portion having a hollow shell, a support surrounding a top end of said shell, an interior molding surface at the bottom end of said shell and together with said shell defining a receptacle for receiving said male mold portion and a second principal longitudinal axis;

B. providing a mold alignment device comprised of (a) a male mold support having a first planar surface with vacuum attaching means thereon, said vacuum attaching means having (i) a first cavity in said first planar surface, (ii) a cylindrical body in said first cavity and projecting therefrom, (iii) a flange surrounding said cylindrical body, and (iv) a passageway therethrough for connection to a vacuum pump;

(b) a female mold support having a second planar surface parallel to said first parallel surface, said second planar surface having locating means thereon which have (i) a second cavity in said second planar surface, (ii) an outer sleeve in said second cavity, (iii) an inner sleeve in said outer sleeve with an end of said inner sleeve projecting above said second planar surface, and (iv) a shoulder portion on said end of said inner sleeve;

C. inserting said male mold portion into said receptacle of said female mold portion to form a mold assembly with said interior and exterior molding surfaces in confronting relationship to form a molding cavity;

D. placing said female mold portion of said assembly on said shoulder of said locating means of said female mold support;

E. moving said first planar surface of said male mold support into contact with said male mold portion and securing said male mold portion thereto via said vacuum attaching means while maintaining said first and second planar surfaces in a parallel relationship to each other;

F. urging said top and bottom planar surfaces toward one another a sufficient distance so as to position said first and second longitudinal axes at right angles to said planar surfaces and place said axes in coincident alignment with each other;

G. opening said molding cavity by vertically removing said male mold portion from said female mold portion while said male mold portion remains attached to said first planar surface in said coincident alignment;

H. charging a quantity of reactive material to said female portion;

I. closing said molding cavity by inserting said male mold portion into said female mold portion with said male mold portion secured to said first planar surface in said coincident alignment;

J. reacting said reactive material; and

K. recovering said optical device from said mold.

12. A method of molding vision correcting devices placed on or in the eye, said method utilizing reactive components and a mold having male and female mold portions adapted to form a molding cavity each of said mold portions having a longitudinal axis, said method comprising the steps of A. vertically positioning said mold on a female mold support, said female mold portion being slidably positioned thereon, B. attaching said male mold portion to a vacuum attaching means of a male mold support and vertically urging said male and female mold portions toward one another a sufficient distance so as to insert said male mold portoin into said female mold portion, and position the longitudinal axes of said male and female mold portions into coincident alignment with each other, C. maintaining said coincident alignment while vertically separating said mold portions, said male portion remaining secured to said male support and said female mold portion remaining positioned to said female support, D. charging said reactive material to said female portion while said mold portions are separated and in coincident alignment, E. maintaining said coincident alignment while vertically inserting said male portion in said female portion to form a pool of unreacted reactive material having the configuration of the desired optical device, said male portion remaining secured to said male support and said female portion remaining positioned to said female support, F. reacting said reactive material.

13. A method according to claim 12 wherein said vision correcting devices are selected from the group consisting of contact lenses, intraocular lenses and lenses used in corneal transplants and implants.

14. An apparatus for molding optical devices comprising a top mold support which has a first planar surface, a vacuum attachment means on said first planar surface comprising (i) a first cavity in said first planar surface, (ii) a cylindrical body in said first cavity having a portion projecting therefrom, (iii) a flange around said projecting portion, and (iv) a passageway therethrough for connection to a vacuum pump;

a bottom mold support which has a second planar surface parallel to said first planar surface, a locating means on said second planar surface comprising (i) a second cavity in said second planar surface, (ii) an outer sleeve in said second cavity, (iii) an inner sleeve in said outer sleeve having a portion that projects above said second planar surface, and (iv) a shoulder portion on said projecting portion, a frame having guide means thereon, said guide means passing through said top and bottom supports for permitting vertical movement of said top and bottom supports with respect to each other while maintaining said first and second planar surfaces parallel to each other.

15. An apparatus according to claim 14 comprising a predetermined array of said vacuum attachment means and a predetermined array of said locating means.

16. An apparatus according to claim 14 wherein said flange has a smooth face which is parallel to and contacts said first planar surface.

17. An apparatus according to claim 14 having means for moving said top and bottom mold supports vertically with respect to one another.

18. An apparatus according to claim 14 further comprising a means for charging a desired quantity of reactive material to either of a first or second mold portion which are to be respectively located on said top and bottom mold supports.

19. An apparatus according to claim 18 further comprising a means for starting reaction of said reactive material.

* * * * *